US005291191A

United States Patent [19]

Moore

[11] Patent Number: 5,291,191

[45] Date of Patent: Mar. 1, 1994

[54] MEDICINE DISPENSER

[76] Inventor: Don L. Moore, P.O. Box 1022, 15 Carte Sq., West Plains, Mo. 65775

[21] Appl. No.: 855,101

[22] Filed: Mar. 20, 1992

[51] Int. Cl.[5] .......................... G07F 9/02; H04Q 1/00

[52] U.S. Cl. .......................... 340/825.35; 340/692; 340/825.19; 221/3

[58] Field of Search .................. 340/825.35, 825.19, 340/309.4, 309.15, 692; 364/478, 479; 221/2, 3, 9, 12, 13, 15, 29, 197

[56] References Cited

U.S. PATENT DOCUMENTS

| | | | |
|---|---|---|---|
| 3,176,815 | 4/1965 | Farinola | 194/1 |
| 3,224,544 | 12/1965 | Shoher et al. | 194/10 |
| 3,258,153 | 6/1966 | Morgan et al. | 221/3 |
| 3,998,356 | 12/1976 | Christensen | 221/2 |
| 4,223,801 | 9/1980 | Carlson | 221/3 |
| 4,275,384 | 6/1981 | Hicks et al. | 340/309.4 |
| 4,473,884 | 9/1984 | Behl | 364/479 |
| 4,504,153 | 3/1985 | Schollmeyer et al. | 368/10 |
| 4,717,042 | 1/1988 | McLaughlin | 221/3 |
| 4,731,765 | 3/1988 | Cole et al. | 368/10 |
| 4,835,520 | 5/1989 | Aiello | 340/309.15 |
| 4,942,544 | 7/1990 | McIntosh et al. | 340/309.4 |
| 4,988,980 | 1/1991 | Graham | 340/692 |
| 5,200,891 | 4/1993 | Kehr et al. | 221/2 |

*Primary Examiner*—Donald J. Yusko
*Assistant Examiner*—Mark H. Rinehart
*Attorney, Agent, or Firm*—Walker, McKenzie & Walker

[57] ABSTRACT

A medicine dispenser for allowing first and second medicine doses to be safely dispensed. The medicine dispenser includes a housing having a first compartment for holding the first medicine dose and for movement between a closed position in which access to the first medicine dose is prevented and an opened position in which access to the first medicine dose is allowed, and having a second compartment for holding the second medicine dose and for movement between a closed position in which access to the second medicine dose is prevented and an opened position in which access to the second medicine dose is allowed; a sound mechanism for selectively broadcasting audible descriptions of the first and second medicine doses; a first compartment switch for causing the sound mechanism to broadcast the audible description of the first medicine dose and for allowing the first compartment to move from the closed position to the opened position; and a second compartment switch for causing the sound mechanism to broadcast the audible description of the second medicine dose and for allowing the second compartment to move from the closed position to the opened position.

12 Claims, 2 Drawing Sheets

MEDICINE DISPENSER

BACKGROUND OF THE INVENTION

1. Field of the Invention

The present invention relates, in general, to a medicine dispenser especially designed to allow a person with visual impairments to safely dispense one or more medicine doses from a plurality of medicine doses.

2. Description of the Related Art

When people who have an acute visual handicap take medicine, they must normally rely on another person as an assistant to insure that they take the proper medicine in the proper dose and at the proper time. At best, such reliance is an annoyance to both the person with visual impairments and the assistant, especially when medicine must be taken late at night and/or early in the morning, etc. At worst, such reliance can be dangerous and life threatening if, for example, the assistant is unavailable and the person with visual impairments takes the wrong medicine.

A preliminary patentability search in class 221, subclasses 2 and 3, and class 206, subclasses 536, 538 and 828 produced the following patents which may be relevant to the present invention: Farinola, U.S. Pat. No. 3,176,815, issued Apr. 6, 1965; Shoher et al., U.S. Pat. No. 3,224,544, issued Dec. 21, 1965; Christensen, U.S. Pat. No. 3,998,356, issued Dec. 21, 1976; Carlson, U.S. Pat. No. 4,223,801, issued Sep. 23, 1980; Hicks et al., U.S. Pat. No. 4,275,384, issued Jun. 23, 1981; Behl, U.S. Pat. No. 4,473,884, issued Sep. 25, 1984; Schollmeyer et al., U.S. Pat. No. 4,504,153, issued Mar. 12, 1985; McLaughlin, U.S. Pat. No. 4,717,042, issued Jan. 5, 1988; and Cole et al., U.S. Pat. No. 4,731,765, issued Mar. 15, 1988.

Farinola and Shoher et at. disclose coin operated vending machines that provide audible messages each time coins are inserted into the machines to urge the sale of a particular brand of merchandise prior to the selection of one of the different items vended by the machines.

Christensen discloses an electronic apparatus for selectively dispensing articles at a predetermined time, such as pills in hospitals and nursing homes where stringent controls are needed to prevent mistakes in dispensing or misuse of prescribed pills.

Carlson discloses an automatic medication dispenser for providing an orderly storage of a plurality of drugs to be taken in a given time period, and for providing a signal to indicate when a specific drug is to be taken at a predetermined time interval relative to previously administered drugs.

Hicks et al. discloses a portable medicine cabinet with a timer for private use by an individual taking several different medicines and which may be carried from the home to the office or the like so as to assure that an individual does not either forget to take doses of prescribed medicines, or take doses of the prescribed medicine too often so as to endanger his health. The Hicks et al. medicine cabinet has a plurality of freely accessible compartments therein and time computer means into which a plurality of predetermined time intervals for taking a dose of the respective medicines may be entered. An indicator means is electrically connected to the time computer means and indicates the predetermined time intervals and which of the medicines should be removed from its respective compartment.

Behl discloses a portable medication dispensing system comprising a dispenser having a plurality of compartments for containing doses of medicine; audible and visual indicating means on the dispenser corresponding to the compartments; programmer means associated with the dispenser for utilizing input data pertaining to a patient's medication prescription and personal habits to develop a program corresponding to a timed medication schedule for the patient; a programmable electronic memory in the dispenser for storing the program; means for entering the program into the memory directly from the programmer means; and means in the dispenser acting responsive to the program in the memory for activating the indicating means when the time of day coincides with the time of the medication schedule.

Schollmeyer et al. discloses a pharmacist-programmable medication prompting system including a programmable prompting device that is attached to a medication container to automatically prompt a patient to take medication at prescribed times.

McLaughlin discloses a medicine dispenser for home health care including a container having a lid and a removable compartmentalized tray which can be positioned upon an interior container ledge and held within the container interior immediately beneath the lid when closed. The tray includes a series of apertures dimensioned and positioned on the periphery of the tray to interact with a series of pegs positioned on the ledge. The arrangement permits only a properly encoded tray to be positioned within the container interior. The lid is provided with a plurality of spring-loaded, hinged tray compartment covers aligned directly over corresponding tray compartments which can be selectively opened and shut to expose the contents of any desired tray compartment. The medicine dispenser is further provided with a microprocessor within the container interior which, together with a control button on the lid, controls the operation of an audible and visual alarm, as well as the automatic opening of selected compartment covers.

Cole et al. discloses a medication reminder device including a housing having a compartment for containing a plurality of individual medication units; a cover hinged to the top of the compartment; a latch mechanism mounted on the compartment to lock and unlock the cover; an electric circuit having a timer system within the housing for controlling the latch mechanism, to lock and unlock the cover at adjustable time intervals so the medication units can be removed when needed; and an audible signal emitter in the circuit activated by the timer system at the adjustable time intervals to notify a person when to remove a medication unit from the compartment.

Nothing in the above patents discloses or suggests the present invention. More specifically, nothing in the above prior art discloses or suggests a medicine dispenser including a housing having first compartment means for holding a first medicine dose and for movement between a closed position in which access to the first medicine dose is prevented and an opened position in which access to the first medicine dose is allowed, and having second compartment means for holding a second medicine dose and for movement between a closed position in which access to the second medicine dose is prevented and an opened position in which access to the second medicine dose is allowed; sound means for selectively broadcasting audible descriptions of the first and second medicine doses; first compartment switch means for causing the sound means to broadcast the audible description of the first medicine dose and for allowing the first compartment means to move from the closed position to the opened position; and second compartment switch means for causing the sound means to broadcast the audible description of the second medicine dose and for allowing the second compartment means to move from the closed position to the opened position.

SUMMARY OF THE INVENTION

The present invention is directed toward providing an improved medicine dispenser for allowing a person with visual impairments to safely dispense one or more medicine doses from a plurality of different medicine doses. The concept of the present invention is to provide a medicine dispenser which will house a plurality of medicine doses, which allows a user to gain access to a specific one of the plurality of medicine doses, and which will broadcast an audible description of that specific medicine dose to insure that the user gains access to the desired medicine dose.

The medicine dispenser of the present invention includes, in general, a housing having first compartment means for holding a first medicine dose and for movement between a closed position in which access to the first medicine dose is prevented and an opened position in which access to the first medicine dose is allowed, and having second compartment means for holding a second medicine dose and for movement between a closed position in which access to the second medicine dose is prevented and an opened position in which access to the second medicine dose is allowed; sound means for selectively broadcasting audible descriptions of the first and second medicine doses; first compartment switch means for causing the sound means to broadcast the audible description of the first medicine dose and for allowing the first compartment means to move from the closed position to the opened position; and second compartment switch means for causing the sound means to broadcast the audible description of the second medicine dose and for allowing the second compartment means to move from the closed position to the opened position.

DESCRIPTION OF THE PREFERRED EMBODIMENT

Figure 1:
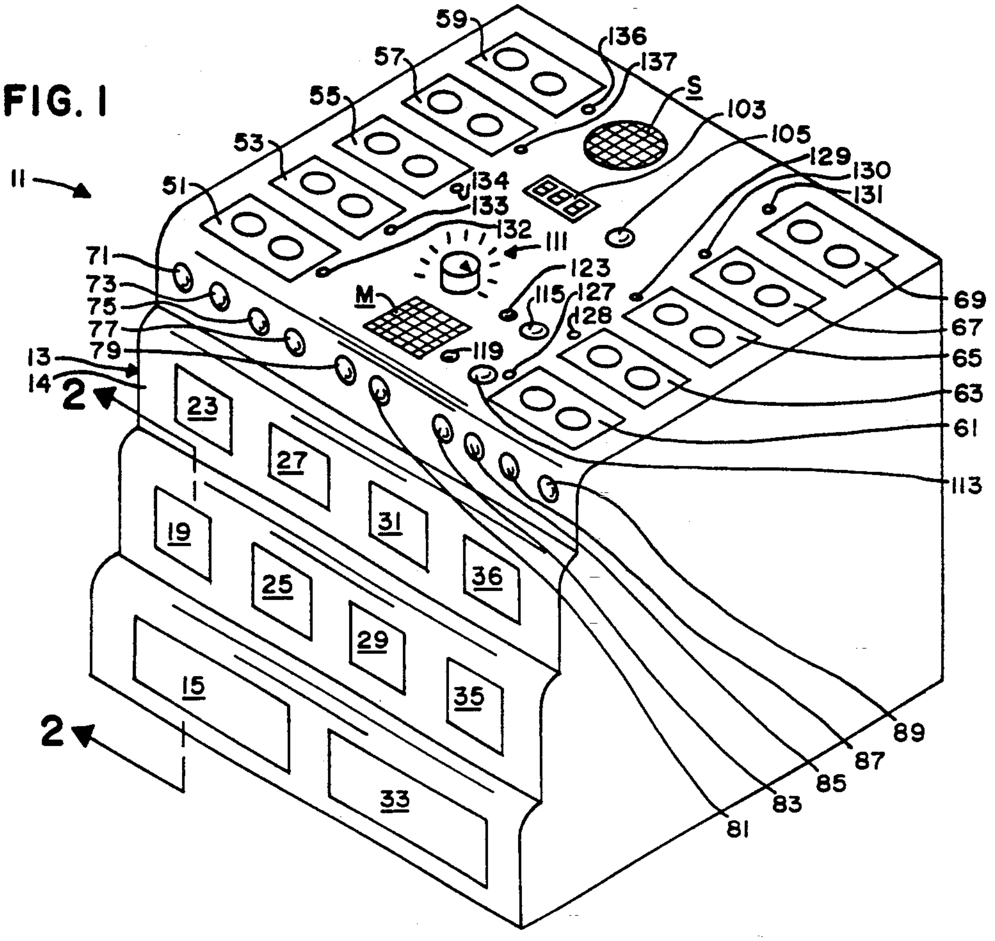
FIG. 1 is a perspective view of the medicine dispenser of the present invention.

The preferred embodiment of the medicine dispenser of the present invention is shown in FIGS. 1-5, and identified by the numeral 11. The medicine dispenser 11 is especially designed for allowing a person with acute visual impairments to safely dispense one or more medicine doses from a plurality of different medicine doses.

The medicine dispenser 11 includes a housing 13 having compartment means for containing a medicine dose. The housing 13 preferably includes a plurality of compartment means for containing a plurality of medicine doses. More specifically, the housing 13 preferably includes a box-like body or cabinet 14, a first compartment means 15 movably mounted to the cabinet 14 for holding a first medicine dose 15, and a second compartment means 19 movably mounted to the cabinet 14 of the housing 13 for holding a second medicine dose 21. The housing 13 of the preferred embodiment of the medicine dispenser 11 shown in FIG. 1 includes ten separate compartment means for holding ten different medicine doses, etc., as will now be apparent to those skilled in the art. Thus, the housing 13 shown in FIG. 1 includes a third compartment means 23, a fourth compartment means 25, a fifth compartment means 27, a sixth compartment means 29, a seventh compartment means 31, an eighth compartment means 33, a ninth compartment means 35, and a tenth compartment means 36.

Figure 2:
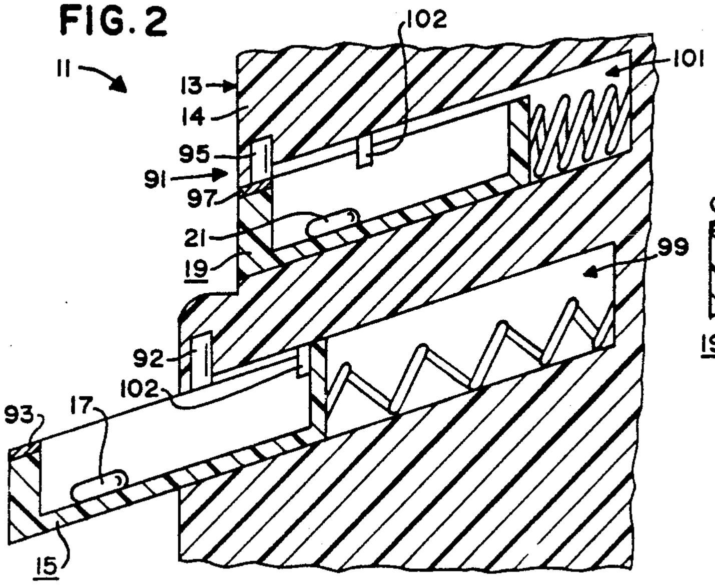
FIG. 2 is an enlarged scale sectional view of a portion of the medicine dispenser of the present invention substantially as taken on line 2—2 of FIG. 1 but showing the first compartment means of the housing thereof in an opened position.
Figure 3:
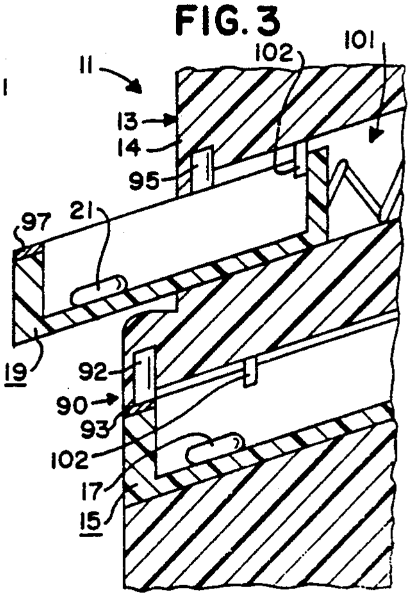
FIG. 3 is a sectional view similar to FIG. 2 but with the first compartment means in the closed position and with the second compartment means in the opened position.

Each compartment means is movable between a closed position in which access to the medicine dose held therein is prevented, and an opened position in which access to the medicine dose held therein is allowed. Thus, for example, each compartment means may consist of a drawer or the like slidably mounted to the cabinet 14 of the housing 13, in any typical manner as will now be apparent to those skilled in the art such as by way of typical drawer slide and guide mechanisms (not shown), for movement between a closed position in which access to the medicine dose held therein is prevented, and an opened position in which access to the medicine dose held therein is allowed. Each compartment means is shown in the closed position in FIG. 1. In FIG. 2, the first compartment means 15 is shown in the opened position to allow access to the first medicine dose 17, while the second compartment means 21 is shown in the closed position to prevent access to the second medicine dose 21. In FIG. 3, the first compartment means 15 is shown in the closed position to prevent access to the first medicine dose 17, while the second compartment means 21 is shown in the opened position to allow access to the second medicine dose 21.

The medicine dispenser 11 includes sound means for selectively broadcasting audible descriptions, etc., of the various medicine doses held within the various compartment means. The sound means preferably includes a sound playback means associated with each particular compartment means for broadcasting an audible description, etc., of the medicine dose held within that particular compartment means when that particular compartment means is moved to the opened position, or just prior to or just after that particular compartment means is moved to the opened position. Thus, the medicine dispenser 11 includes sound means for selectively broadcasting an audible description, etc., of the first medicine dose 17 when the first compartment means 15 is moved to the opened position, or just prior to or just after the first compartment means 15 is moved to the opened position, and for selectively broadcasting an audible description, etc., of the second medicine dose 21 when the second compartment means 19 is moved to the opened position, or just prior to or just after the second compartment means 19 is moved to the opened position.

The specific construction and operation of the sound means may vary as will now be apparent to those skilled in the art. For example, the sound means may include typical tape recorder means or the like for allowing an audible description, etc., of each particular medicine dose to be selectively recorded or digitized by speaking into a microphone M and played back through a speaker S, etc., as will now be apparent to those skilled in the art. While the level of skill in the recording/-playback art is such that it is possible to have multiple messages recorded on a single recorder from one recording station through a switching device, etc., the sound means is shown diagrammatically in FIGS. 4 and 5 as including a first sound means 39 for being associated with the first compartment means 15, a second sound means 41 for being associated with the second compartment means 19, etc. The first sound means 39 is shown diagrammatically in FIG. 4 as including a sound playback means 43 and in FIG. 5 as including a sound record means 45. The second sound means 41 is shown diagrammatically in FIG. 4 as including a sound playback means 47 and in FIG. 5 a including a sound record means 49.

Such sound playback means and sound record means may consist of portions of a typical automatic rewind tape recorder means for use with a typical cassette tape or may consist of digital sound playback and record means, etc., as will now be apparent to those skilled in the art. Thus, as shown in the drawings, the first sound means 39 may include a first cassette tape 51 for use in recording an audible description, etc., of the first medicine dose 19, and the second sound means 41 may include a second cassette tape 53 for use in recording an audible description, etc., of the second medicine dose 21.

Figure 4:
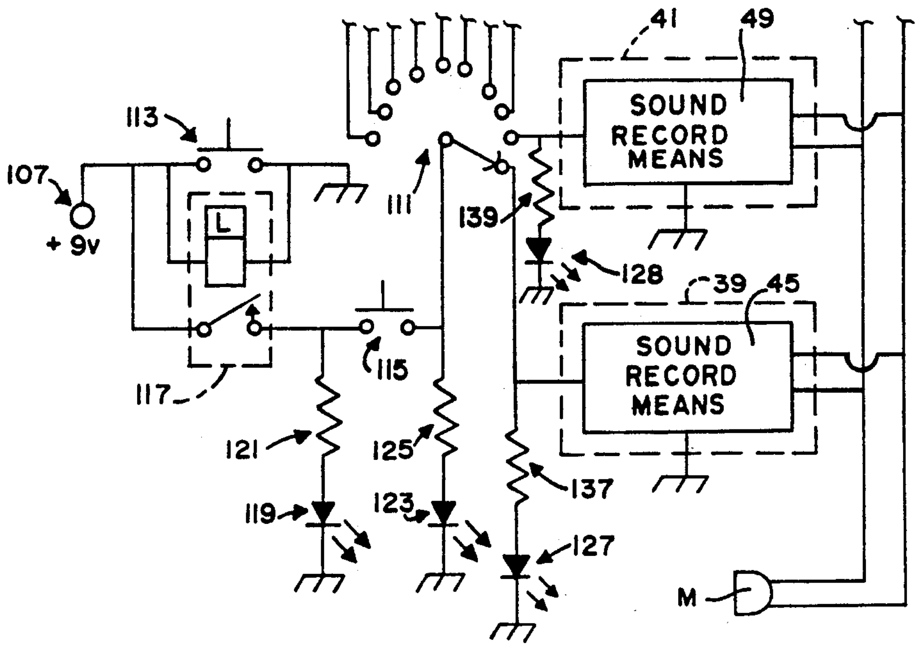
FIG. 4 is a diagram of a portion of the electrical circuit of the medicine dispenser of the present invention.
Figure 5:
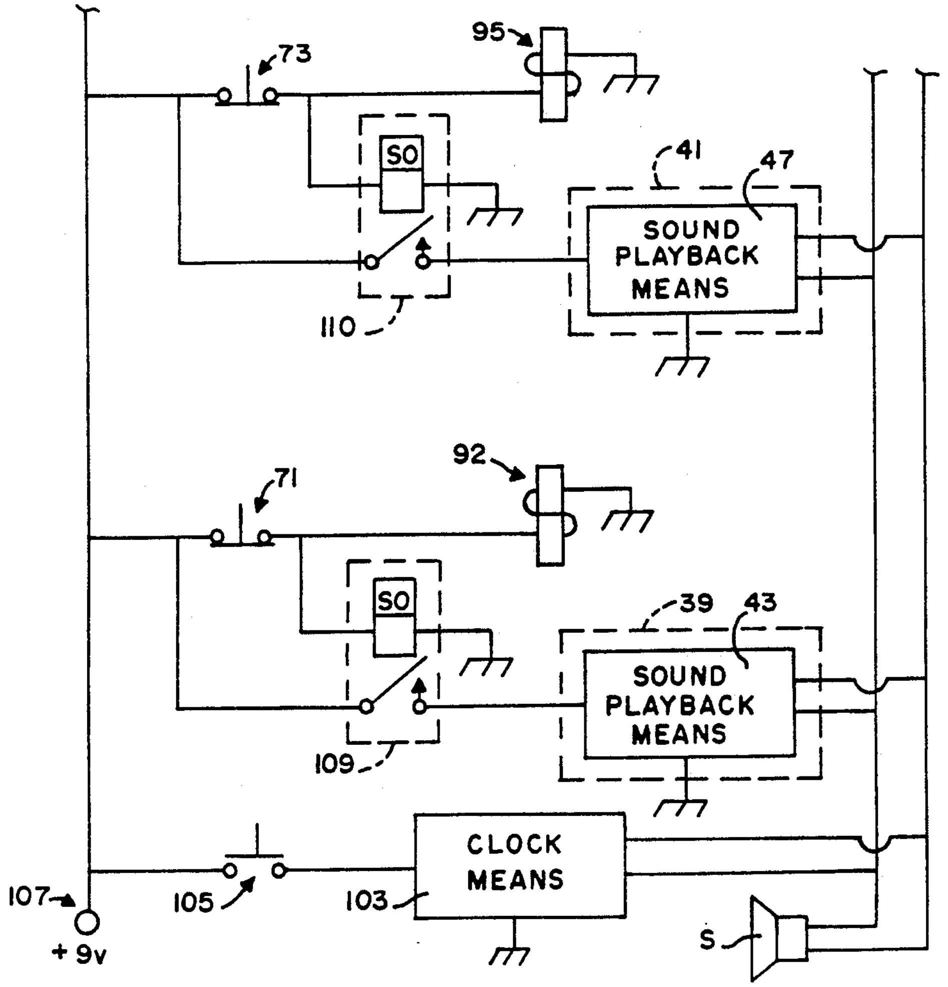
FIG. 5 is a diagram of another portion of the electrical circuit of the medicine dispenser of the present invention.

It should be understood that the sound means also preferably includes additional third, fourth, fifth, sixth, seventh, eighth, ninth and tenth sound means, etc., depending on the total number of compartment means associated therewith as will now be apparent to those skilled in the art. For sake of clarity and simplicity, only the first and second sound means 39, 41 are shown in FIGS. 4 and 5. However, the operation and construction of any multiple of such sound means is preferably identical to that described hereinabove relative to the first and second sound means 39, 41 and as will now be apparent to those skilled in the art. Accordingly, as shown in FIG. 1, the third sound means may include a third cassette tape 55 for use in recording an audible description, etc., of the third medicine dose, the fourth sound means may include a fourth cassette tape 57 for use in recording an audible description, etc., of the fourth medicine dose, the fifth sound means may include a fifth cassette tape 59 for use in recording an audible description, etc., of the fifth medicine dose, the sixth sound means may include a sixth cassette tape 61 for use in recording an audible description, etc., of the sixth medicine dose, the seventh sound means may include a seventh cassette tape 63 for use in recording an audible description, etc., of the seventh medicine dose, the eighth sound means may include an eighth cassette tape 65 for use in recording an audible description, etc., of the eighth medicine dose, the ninth sound means may include a ninth cassette tape 67 for use in recording an audible description, etc., of the ninth medicine dose, and the tenth sound means may include a tenth cassette tape 69 for use in recording an audible description, etc., of the tenth medicine dose. The various cassette tapes may be removably associated with the respective sound playback and record means behind doors or the like in the top of the cabinet 14 as shown in FIG. 1 and as will now be apparent to those skilled in the art. An ejector button (not shown) may be coupled to each door, etc.

The medicine dispenser 11 includes a first compartment switch means 71 (see FIGS. 1 and 5) for causing the sound means to broadcast the audible description, etc., of the first medicine dose 17 and for allowing the first compartment means 15 to move from the closed position to the opened position, and a second compartment switch means 73 (see FIGS. 1 and 5) for causing the sound means to broadcast the audible description, etc., of the second medicine dose 21 and for allowing the second compartment means 19 to move from the closed position to the opened position. The medicine dispenser 11 preferably includes a compartment switch means for each compartment means of the housing 13. Thus, the medicine dispenser 11 preferably includes a third compartment switch means 75 for causing the third sound means to broadcast an audible description, etc., of the third medicine dose and for allowing the third compartment means 23 to move from the closed position to the opened position, a fourth compartment switch means 77 for causing the fourth sound means to broadcast an audible description, etc., of the fourth medicine dose and for allowing the fourth compartment means 25 to move from the closed position to the opened position, a fifth compartment switch means 79 for causing the fifth sound means to broadcast an audible description, etc., of the fifth medicine dose and for allowing the fifth compartment means 27 to move from the closed position to the opened position, a sixth compartment switch means 81 for causing the sixth sound means to broadcast an audible description, etc., of the sixth medicine dose and for allowing the sixth compartment means 29 to move from the closed position to the opened position, a seventh compartment switch means 83 for causing the seventh sound means to broadcast an audible description, etc., of the seventh medicine dose and for allowing the seventh compartment means 31 to move from the closed position to the opened position, an eighth compartment switch means 85 for causing the eighth sound means to broadcast an audible description, etc., of the eighth medicine dose and for allowing the eighth compartment means 33 to move from the closed position to the opened position, a ninth compartment switch means 87 for causing the ninth sound means to broadcast an audible description, etc., of the ninth medicine dose and for allowing the ninth compartment means 35 to move from the closed position to the opened position, and a tenth compartment switch means 89 for causing the tenth sound means to broadcast an audible description, etc., of the tenth medicine dose and for allowing the tenth compartment means 36 to move from the closed position to the opened position, etc., as will now be apparent to those skilled in the art (see FIG. 1).

Each compartment switch means preferably consists of a typical push-button type, normally closed electrical switch mounted on the top edge of the front of the housing 13 as shown in FIG. 1 and coupled to the respective sound means, etc., as diagrammatically shown in FIG. 5 with respect to the first and second compartment switch means 71, 73 and the first and second sound means 39, 41, as will now be apparent to those skilled in the art. The remaining compartment switch means are preferably coupled to their respective sound means, etc., by portions of the electrical circuit that are mirror images of those portions shown in FIG. 5 relative to the first and second compartment switch means 71, 73 as will now be apparent to those skilled in the art.

The medicine dispenser 11 preferably includes lock means for selectively locking the various compartment means in the closed positions. Thus, the medicine dispenser 11 preferably includes a first lock means 90 for locking the first compartment means 15 in the closed position, and a second lock means 91 for locking the second compartment means 19 in the closed position. The medicine dispenser 11 preferably includes a lock means for each compartment means of the housing 13. Thus, the medicine dispenser 11 preferably includes a third lock means for locking the third compartment means 23 in the closed position; a fourth lock means for locking the fourth compartment means 25 in the closed position; a fifth lock means for locking the fifth compartment means 27 in the closed position; a sixth lock means for locking the sixth compartment means 29 in the closed position; a seventh lock means for locking the seventh compartment means 31 in the closed position; an eighth lock means for locking the eighth compartment means 33 in the closed position; a ninth lock means for locking the ninth compartment means 35 in the closed position; and a tenth lock means for locking the tenth compartment means 36 in the closed position, etc., depending on the total number of compartment means provided in the medicine dispenser 11, as will now be apparent to those skilled in the art.

The specific construction and operation of such lock means may vary as will now be apparent to those skilled in the art. For example, the first lock means 90 may include an electromagnet means 92 and a magnetic member 93 for being securely attracted to and held by the electromagnet means 92 when the electromagnet means 92 is electrically energized and the magnetic member 93 is in fairly close proximity to the electromagnet means 92 as will now be apparent to those skilled in the art. The electromagnet means 92 may be fixedly attached to the cabinet 14 of the housing 13 adjacent the first compartment means 15 and the magnetic member 93 may be fixedly attached to the drawer that forms the first compartment means 15 in such positions that the magnetic member 93 will be positioned directly beneath the electromagnet means 92 when the first compartment means 15 is in the closed position as shown in FIG. 3. The electromagnet means 92 is preferably electrically coupled to the normally closed first compartment switch means 71 so that the electromagnet means 92 is normally energized as will hereinafter become apparent to those skilled in the art. Likewise, the second lock means 91 may include an electromagnet means 95 and a magnetic member 97 for being securely attracted to and held by the electromagnet means 95 when the electromagnet means 95 is electrically energized and the magnetic member 97 is in fairly close proximity to the electromagnet means 95 as will now be apparent to those skilled in the art. The electromagnet means 95 may be fixedly attached to the cabinet 14 of the housing 13 adjacent the second compartment means 19 and the magnetic member 97 may be fixedly attached to the drawer that forms the second compartment means 19 in such positions that the magnetic member 97 will be positioned directly beneath the electromagnet means 95 when the second compartment means 19 is in the closed position as shown in FIG. 2. The electromagnet means 95 is preferably electrically coupled to the normally closed second compartment switch means 73 so that the electromagnet means 95 is normally energized as will hereinafter become apparent to those skilled in the art.

The specific construction and operation of the additional third, fourth, fifth, sixth, seventh, eighth, ninth, and tenth lock means, etc., may be identical to that of the first and second lock means 90, 91 and, for sake of clarity and simplicity, only the first and second lock means 90, 91 are described in detail or shown in detail in the drawings. However, the operation and construction of such additional lock means will be apparent to those skilled in the art from the present disclosure.

The medicine dispenser 11 preferably includes urging means for urging the compartment means to the opened position. Thus, the medicine dispenser 11 preferably includes first urging means 99 for urging the first compartment means 15 to the opened position when the first lock means 90 is moved to the unlocked position, and preferably includes second urging means 101 for urging the second compartment means 19 to the opened position when the second lock means 91 is moved to the unlocked position. The medicine dispenser 11 preferably includes urging means for each compartment means of the housing 13. Thus, the medicine dispenser 11 preferably includes a third urging means for urging the third compartment means 23 to the opened position; a fourth urging means for urging the fourth compartment means 25 to the opened position; a fifth urging means for urging the fifth compartment means 27 to the opened position; a sixth urging means for urging the sixth compartment means 29 to the opened position; a seventh urging means for urging the seventh compartment means 31 to the opened position; an eighth urging means for urging the eighth compartment means 33 to the opened position; a ninth urging means for urging the ninth compartment means 35 to the opened position; and a tenth urging means for urging the tenth compartment means 36 to the opened position, etc., depending on the total number of compartment means provided in the medicine dispenser 11, as will now be apparent to those skilled in the art.

The specific construction and operation of the urging means may vary as will now be apparent to those skilled in the art. For example, the urging means 99, 101 may consist simply of coil spring members associated with the housing 13 and the respective compartment means 15, 19 in such a manner (see FIGS. 2 and 3) so as to push the respective compartment means 15, 19 from the closed position to the opened position when the respective lock means 90, 91 is "unlocked" as will now be apparent to those skilled in the art.

The specific construction and operation of the additional urging means may be identical to that of the first and second urging means 85, 87 and, for sake of clarity and simplicity, only the first and second urging means 99, 101 are described in detail and shown in the drawings. However, the operation and construction of such additional urging means will now be apparent to those skilled in the art.

In addition, the cabinet 14 of the housing 13 may be designed so the various compartment means 23 slide downwardly from the closed position to the opened position as clearly shown in FIGS. 2 and 3 whereby gravity defines, at least in part, the urging means, etc., as will now be apparent to those skilled in the art. Further, stop means 102 may be provided on the housing 13 in a position so as to engage the rear wall of each compartment means when the respective compartment means is in the opened position (see FIGS. 2 and 3) to act as a positive stop to prevent the respective compartment means from being inadvertently removed from the housing 13 as will now be apparent to those skilled in the art.

The medicine dispenser 11 may include clock means 103 for selectively displaying and/or broadcasting an audible current time message. The construction and operation of the clock means 103 may vary as will now be apparent to those skilled in the art. However, the clock means 103 preferably consist of a typical solid state integrated circuit clock module as will now be apparent to those skilled in the art. A clock switch means 105 is preferably provided for allowing the user of the medicine dispenser 11 to selectively activate the clock means 103 to cause the clock means 103 to broadcast the audible current time message. The clock switch means 105 may include a typical normally opened, push-button type electrical switch mounted on the top of the housing 13 as shown in FIG. 1 and electrically coupled to the clock module of the clock means 103 as will now be apparent to those skilled in the art.

An example of portions of preferred electrical circuitry of the medicine dispenser 11 are shown in FIGS. 4 and 5 with the various electrical components coupled to an electrical energy source 107 such as the positive 9 volt terminal of a typical battery. The compartment switch means 71, 73 are shown in FIG. 5 as electrically connecting the respective electromagnetic means 92, 95 directly to the electrical energy source 107 and as electrically connecting the respective sound playback means 73, 47 to the electrical energy source 107 through a slow operating relay means 109, 110 or the like. FIG. 5 also shows the sound playback means 43, 47 electrically connected to the speaker S. Each relay means 109, 110 is opened when electrically energized and closes when the electric circuit thereto is broken. Thus, as will now be apparent to those skilled in the art, with the first and second compartment switch means 71, 73 in the normally closed positions as shown in FIG. 5, the associated relay means 109, 110 will be electrically energized and, therefore, opened. However, if either switch means 71, 73 is moved to the opened position, the associated relay means 109, 110 will close and electrically energize the associated sound playback means 43, 47 to thereby broadcast an audible description, etc., of the associated medicine dose 17, 19, etc., through the speaker S as will now be apparent to those skilled in the art. It should be noted that the various other compartment switch means for the various other compartments (e.g., the third compartment switch means 75 for the third compartment means 23, etc.) are electrically associated with a respective magnetic means and a respective sound playback means through respective relay means, and with the speaker S, in an identical manner to that shown and described relative to the first and second compartment switch means 71, 73, etc., as will now be understood by those skilled in the art. FIG. 5 also shows the clock switch means 105 electrically connecting the clock means 103 to the electrical energy source 107 and shows the clock means 103 electrically connected to the speaker S so that the clock means 103 will cause the speaker S to broadcast an audible current time message when the clock switch means 105 is closed as will now be apparent to those skilled in the art.

The sound record means 45, 49 are shown in FIG. 4 as being electrically connected to the electrical energy source 107 through a typical rotary selector switch means 111, a typical normally opened first record switch 113, and a typical normally opened second record switch 115. The first record switch 113 is preferably electrically connected to a typical latching relay means 117 or the like to allow the user of the medicine dispenser 11 to electrically energize the first portion of the circuit shown in FIG. 4 (i.e., to electrically energize the second record switch 115) as will now be apparent to those skilled in the art. The selector switch 111, first record switch 113 and second record switch 115 may be positioned on top of the housing 13 as shown in FIG. 1 to allow the user of the medicine dispenser 11 easy access thereto. The second record switch 11 is electrically connected between the latching relay means 117 and the selector switch 111 as shown in FIG. 4 to allow the user of the medicine dispenser 11 to electrically energize the selector switch 111, and thus a respective sound record means, when the relay means 117 is closed as will now be apparent to those skilled in the art. A first light means 119 (e.g., a typical red light emitting diode) is preferably electrically connected to the latching relay means 117 as shown in FIG. 4 for providing a visual indication when the latching relay means 117 is closed, etc., as will now be apparent to those skilled in the art. The first light means 119 may be positioned on the top of the housing 13 adjacent the first record switch 113 as shown in FIG. 1. A resistor 121 is preferably provided as shown in FIG. 4 to limit the electrical current to the first light means 119. A second light means 123 (e.g., a typical green light emitting diode) is preferably electrically connected to the second record switch 115 as shown in FIG. 4 for providing a visual indication when the second record switch 115 is closed, etc., as will now be apparent to those skilled in the art. The second light means 123 may be positioned on top of the housing 13 adjacent the second record switch 115 as shown in FIG. 1. A resistor 125 is preferably provided as shown in FIG. 4 to limit the electrical current to the second light means 123. FIG. 4 also shows the sound record means 45, 49 electrically connected to the microphone M. It should be noted that the various other sound record means for the various other sound means (e.g., the third sound means, etc.) are electrically associated with the selector switch 111 through the various contacts shown in FIG. 4, and with the microphone M, in an identical manner to that shown and described relative to the first and second sound record means 45, 49, etc., as will now be understood by those skilled in the art.

The use and operation of the medicine dispenser 11 should now be apparent to those skilled in the art. The initial step in using the medicine dispenser 11 is to insert the specific medicine doses in the specific compartment means and to record an audible description, etc., of the specific medicine doses in the specific sound means. Thus, for example, to insert the medicine dose 17 into the first compartment means 15, the first compartment switch means 71 is opened (e.g., pushed down) to de-energize the electromagnet means 92 and allow the first urging mean 99 to move the first compartment means 15 to the opened position to allow the first medicine dose 17 to be placed thereinto as will now be apparent to those skilled in the art. Opening the first compartment switch means 71 will also cause the sound playback means 43 to broadcast an audible message based on the first cassette tape 51, etc. The first compartment switch means 71 can then be closed or allowed to close and the first compartment means 15 manually moved back to the closed position where the first lock means 90 will hold it. To record a description, etc., of the first medicine dose 17 on the first cassette tape 51, etc., the user turns the selector switch means 111 to electrically connect the first sound record means 45 to the record switches 113, 115 through the selector switch means 111. Indicia or the like is preferably provided on the housing 13 adjacent selector switch means 111 to allow the user to easily and correctly select the proper sound record means. An indicator light means 127, 128, 129, 130, 131, 132, 133, 134, 135, 136 (e.g., a typical light emitting diode) is preferably electrically connected between each sound record means 45, 49, etc., and the respective contact of the selector switch means 111 as indicated in FIG. 4 for providing a visual indication of which specific sound record means 45, 49, etc., is selected by the selector switch means 111, as will now be apparent to those skilled in the art. The indicator light means 127, 128, 129, 130, 131, 132, 133, 134, 135, 136 may be positioned on top of the housing 13 adjacent the respective cassette tape 51, 53, 55, 57, 59, 61, 63, 65, 67, 69 as shown in FIG. 1. A resistor 137, 139 is preferably provided as shown in FIG. 4 to limit the electrical current to each indicator light means 127, 128, 129, 130, 131, 132, 133, 134, 135, 136. The user also closes the first record switch 113 to energize the first portion of the circuit shown in FIG. 4 and cause the first light means 119 to shine. The user then closes the second record switch 115, causing the second light means 123 and a specific indicator light means 127, 128, 129, 130, 131, 132, 133, 134, 135, 136 to shine as will now be apparent to those skilled in the art, and speaks a description, etc., of the first medicine dose 17 into the microphone M as will now be apparent to those skilled in the art. When the first compartment switch means 71 is subsequently opened, the first compartment means 15 will be urged to the opened position allowing access to the first medicine dose 17, and the first sound playback means 43 will broadcast an audible description, etc., of the first medicine dose 17. The other specific medicine doses can be inserted into the other respective compartment means and the audible description, etc., of the various other specific medicine doses can be recorded in the various other respective sound means in a similar manner as will now be apparent to those skilled in the art. Subsequent opening of any of the various compartment switch means will cause the respective compartment means to be urged to the opened position to allow access to the respective medicine dose, and will cause the respective sound playback means to broadcast an audible description, etc., of the respective medicine dose.

Although the present invention has been described and illustrated with respect to a preferred embodiment and a preferred use therefor, it is not to be so limited since modifications and changes can be made therein which are within the full intended scope of the invention.

I claim:

1. A medicine dispenser for allowing first and second medicine doses to be safely dispensed, the medicine dispenser comprising:

a) a housing for containing the medicine doses; the housing including first compartment means for holding the first medicine dose and for movement between a closed position in which access to the first medicine dose is prevented and an opened position in which access to the first medicine dose is allowed; the housing including second compartment means for holding the second medicine dose and for movement between a closed position in which access to the second medicine dose is prevented and an opened position in which access to the second medicine dose is allowed;

b) sound means for selectively broadcasting audible descriptions of the first and second medicine doses;

c) first compartment switch means for causing the sound means to broadcast the audible description of the first medicine dose and for allowing the first compartment means to move from the closed position to the opened position; and d) second compartment switch means for causing the sound means to broadcast the audible description of the second medicine dose and for allowing the second compartment means to move from the closed position to the opened position.

2. The medicine dispenser of claim 1 in which the sound means includes a first sound means for selectively broadcasting an audible description of the first medicine dose; and in which the sound means includes a second sound means for selectively broadcasting an audible description of the second medicine dose.

3. The medicine dispenser of claim 2 in which the first sound means includes a sound record means for allowing an audible description of the first medicine dose to be recorded, and includes a sound playback means for allowing the audible description of the first medicine dose to be played back; and in which the second sound means includes a sound record means for allowing an audible description of the second medicine dose to be recorded, and includes a sound playback means for allowing the audible description of the second medicine dose to be played back.

4. The medicine dispenser of claim 1 in which is included first lock means for locking the first compartment means in the closed position; and in which is included second lock means for locking the second compartment means in the closed position.

5. The medicine dispenser of claim 4 in which the first lock means includes an electromagnet means for locking the first compartment means in the closed position when electrically energized; in which the first compartment switch means is electrically coupled to the electromagnet means of the first lock means for normally electrically energizing the electromagnet means of the first lock means to lock the first compartment means in the closed position; in which the second lock means includes an electromagnet means for locking the second compartment means in the closed position when electrically energized; and in which the second compartment switch means is electrically coupled to the electromagnet means of the second lock means for normally electrically energizing the electromagnet means of the second lock means to lock the second compartment means in the closed position.

6. The medicine dispenser of claim 5 in which is included first urging means for urging the first compartment means to the opened position when the electromagnet means of the first lock means is electrically de-energized; and in which is included second urging means for urging the second compartment means to the opened position when the electromagnet means of the second lock means is electrically de-energized.

7. A medicine dispenser for allowing a person with visual impairments to safely dispense one or more medicine doses from a plurality of different medicine doses, the medicine dispenser comprising:

a) a housing for containing the plurality of medicine doses; the housing including first compartment means for holding a first medicine dose and for movement between a closed position in which access to the first medicine dose is prevented and an opened position in which access to the first medicine dose is allowed; the housing including second compartment means for holding a second medicine dose and for movement between a closed position in which access to the second medicine dose is prevented and an opened position in which access to the second medicine dose is allowed;

b) sound means for selectively broadcasting audible descriptions of the first medicine dose and the second medicine dose;

c) first compartment switch means for causing the sound means to broadcast the audible description of the first medicine dose and for allowing the first compartment means to move from the closed position to the opened position;

d) second compartment switch means for causing the sound means to broadcast the audible description of the second medicine dose and for allowing the second compartment means to move from the closed position to the opened position;

e) first lock means for locking the first compartment means in the closed position; and f) second lock means for locking the second compartment means in the closed position.

8. The medicine dispenser of claim 7 in which the sound means includes a first sound means for selectively broadcasting an audible description of the first medicine dose; and in which the sound means includes a second sound means for selectively broadcasting an audible description of the second medicine dose.

9. The medicine dispenser of claim 8 in which the first sound means includes a sound record means for allowing an audible description of the first medicine dose to be recorded, and includes a sound playback means for allowing the audible description of the first medicine dose to be played back; and in which the second sound means includes a sound record means for allowing an audible description of the second medicine dose to be recorded, and includes a sound playback means for allowing the audible description of the second medicine dose to be played back.

10. The medicine dispenser of claim 7 in which the first lock means includes an electromagnet means for locking the first compartment means in the closed position when electrically energized; in which the first compartment switch means is electrically coupled to the electromagnet means of the first lock means for normally electrically energizing the electromagnet means of the first lock means to lock the first compartment means in the closed position; in which the second lock means includes an electromagnet means for locking the second compartment means in the closed position when electrically energized; and in which the second compartment switch means is electrically coupled to the electromagnet means of the second lock means for normally electrically energizing the electromagnet means of the second lock means to lock the second compartment means in the closed position.

11. The medicine dispenser of claim 10 in which is included first urging means for urging the first compartment means to the opened position when the electromagnet means of the first lock means is electrically de-energized; and in which is included second urging means for urging the second compartment means to the opened position when the electromagnet means of the second lock means is electrically de-energized.

12. A medicine dispenser for allowing a person with visual impairments to safely dispense one or more medicine doses from a plurality of different medicine doses, the medicine dispenser comprising:

a) a housing for containing the plurality of medicine doses; the housing including first compartment means for holding a first medicine dose and for movement between a closed position in which access to the first medicine dose is prevented and an opened position in which access to the first medicine dose is allowed; the housing including second compartment means for holding a second medicine dose and for movement between a closed position in which access to the second medicine dose is prevented and an opened position in which access to the second medicine dose is allowed;

b) sound means for selectively broadcasting audible descriptions of the first medicine dose and the second medicine dose; the sound means including a first sound means for selectively broadcasting an audible description of the first medicine dose; the sound means including a second sound means for selectively broadcasting an audible description of the second medicine dose; the first sound means including a sound record means for allowing an audible description of the first medicine dose to be recorded, and including a sound playback means for allowing the audible description of the first medicine dose to be played back; the second sound means including a sound record means for allowing an audible description of the second medicine dose to be recorded, and including a sound playback means for allowing the audible description of the second medicine dose to be played back;

c) first compartment switch means for causing the sound means to broadcast the audible description of the first medicine dose and for allowing the first compartment means to move from the closed position to the opened position;

d) second compartment switch means for causing the sound means to broadcast the audible description of the second medicine dose and for allowing the second compartment means to move from the closed position to the opened position;

e) first lock means for locking the first compartment means in the closed position; the first lock means including an electromagnet means for locking the first compartment means in the closed position when electrically energized; the first compartment switch means being electrically coupled to the electromagnet means of the first lock means for normally electrically energizing the electromagnet means of the first lock means to lock the first compartment means in the closed position;

f) second lock means for locking the second compartment means in the closed position; the second lock means including an electromagnet means for locking the second compartment means in the closed position when electrically energized; the second compartment switch means being electrically coupled to the electromagnet means of the second lock means for normally electrically energizing the electromagnet means of the second lock means to lock the second compartment means in the closed position;

g) first urging means for urging the first compartment means to the opened position when the electromagnet means of the first lock means is electrically de-energized; and h) second urging means for urging the second compartment means to the opened position when the electromagnet means of the second lock means is electrically de-energized.

* * * * *